United States Patent
Inose et al.

(10) Patent No.: US 9,081,493 B2
(45) Date of Patent: Jul. 14, 2015

(54) METHOD FOR CONTROLLING A USER INTERFACE, INFORMATION PROCESSING APPARATUS, AND COMPUTER READABLE MEDIUM

(75) Inventors: Tsutomu Inose, Kawasaki (JP);
Hiroyuki Nagai, Sakai (JP)

(73) Assignee: Canon Kabushiki Kaisha, Tokyo (JP)

( * ) Notice: Subject to any disclaimer, the term of this patent is extended or adjusted under 35 U.S.C. 154(b) by 897 days.

(21) Appl. No.: 12/469,056

(22) Filed: May 20, 2009

(65) Prior Publication Data

US 2009/0307589 A1 Dec. 10, 2009

(30) Foreign Application Priority Data

Jun. 4, 2008 (JP) ................. 2008-147073

(51) Int. Cl.
| | |
|---|---|
| *G06F 3/01* | (2006.01) |
| *G06F 3/048* | (2013.01) |
| *G06F 3/0488* | (2013.01) |
| *G06F 3/0484* | (2013.01) |
| *G06F 3/0486* | (2013.01) |
| *G06F 3/00* | (2006.01) |
| *G06F 3/033* | (2013.01) |
| *G06F 3/041* | (2006.01) |

(52) U.S. Cl.
CPC .......... *G06F 3/04883* (2013.01); *G06F 3/0486* (2013.01); *G06F 3/04845* (2013.01); *G06F 2203/04808* (2013.01)

(58) Field of Classification Search
CPC ............................. G06F 3/017; G06F 3/0488
USPC ......... 715/700, 702, 764, 769, 770, 863, 866; 345/173
See application file for complete search history.

(56) References Cited

U.S. PATENT DOCUMENTS

| | | | | |
|---|---|---|---|---|
| 5,825,352 A | * | 10/1998 | Bisset et al. ................. | 345/173 |
| 6,002,808 A | * | 12/1999 | Freeman ..................... | 382/288 |
| 6,958,749 B1 | * | 10/2005 | Matsushita et al. .......... | 345/175 |
| 7,030,861 B1 | * | 4/2006 | Westerman et al. ......... | 345/173 |
| 7,138,983 B2 | | 11/2006 | Wakai et al. ................ | 345/173 |

(Continued)

FOREIGN PATENT DOCUMENTS

| | | |
|---|---|---|
| CN | 101131620 A | 2/2008 |
| JP | 2001-290585 | 10/2001 |

(Continued)

OTHER PUBLICATIONS

Japanese Office Action issued on May 18, 2012, in counterpart Japanese application No. 2008-147073.

(Continued)

*Primary Examiner* — Yongjia Pan
(74) *Attorney, Agent, or Firm* — Fitzpatrick, Cella, Harper & Scinto

(57) ABSTRACT

In a user interface that can identify concurrent pointing at a plurality of given positions on a screen, after detecting that a plurality of pointed positions are concurrently present in a display range of one object on a screen, whether or not an operation of moving the other pointed positions is performed, while keeping at least one pointed position among the plurality of pointed positions, is determined. Then, if it is determined that this operation is performed, the processing that is to be executed is decided based on the number of kept pointed positions and the number of moved pointed positions, and the decided process is executed on the object.

9 Claims, 4 Drawing Sheets

(56) References Cited

U.S. PATENT DOCUMENTS

| | | | |
|---|---|---|---|
| 7,479,949 B2* | 1/2009 | Jobs et al. | 345/173 |
| 7,705,830 B2* | 4/2010 | Westerman et al. | 345/173 |
| 7,840,912 B2* | 11/2010 | Elias et al. | 715/863 |
| 7,864,161 B2* | 1/2011 | Hollemans et al. | 345/173 |
| 8,212,782 B2 | 7/2012 | Cho et al. | |
| 8,334,846 B2* | 12/2012 | Westerman et al. | 345/173 |
| 2005/0162402 A1* | 7/2005 | Watanachote | 345/173 |
| 2006/0125803 A1* | 6/2006 | Westerman et al. | 345/173 |
| 2007/0177804 A1* | 8/2007 | Elias et al. | 382/188 |
| 2007/0257891 A1* | 11/2007 | Esenther et al. | 345/173 |
| 2008/0005703 A1* | 1/2008 | Radivojevic et al. | 715/863 |
| 2008/0036743 A1* | 2/2008 | Westerman et al. | 345/173 |
| 2008/0048990 A1* | 2/2008 | Cho et al. | 345/173 |
| 2008/0165140 A1* | 7/2008 | Christie et al. | 345/173 |
| 2008/0168403 A1* | 7/2008 | Westerman et al. | 715/863 |
| 2009/0021489 A1* | 1/2009 | Westerman et al. | 345/173 |
| 2009/0138800 A1* | 5/2009 | Anderson et al. | 715/702 |
| 2009/0153493 A1* | 6/2009 | Mizutani et al. | 345/173 |
| 2010/0293500 A1* | 11/2010 | Cragun et al. | 715/784 |

FOREIGN PATENT DOCUMENTS

| | | |
|---|---|---|
| JP | 2002-304256 | 10/2002 |
| WO | 2007/089766 A | 8/2007 |

OTHER PUBLICATIONS

Dec. 2, 2014 Chinese Official Action in Chinese Patent Appln. 201210404123.2.

* cited by examiner

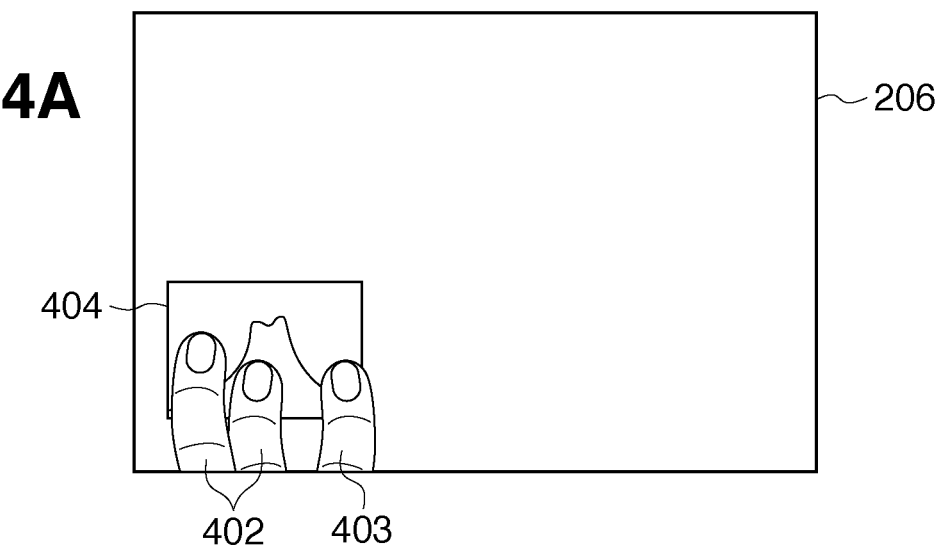
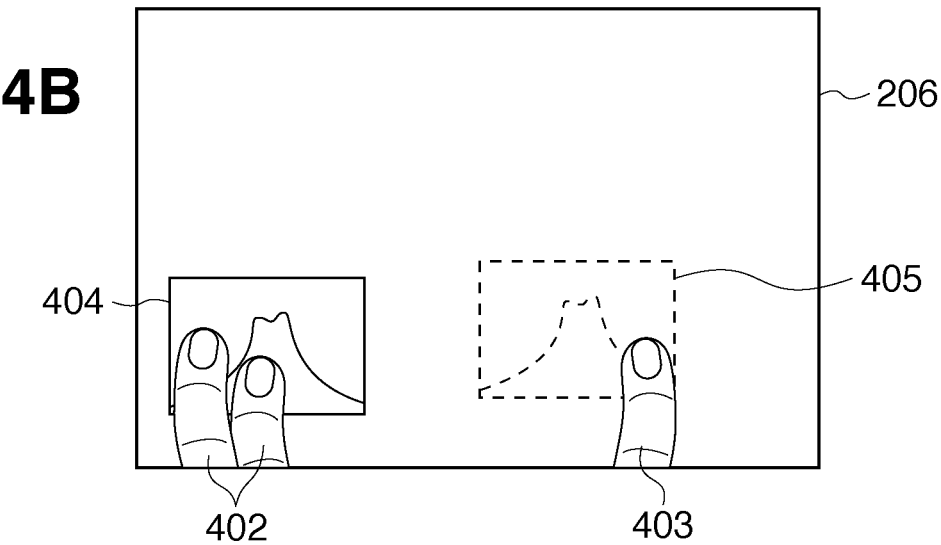
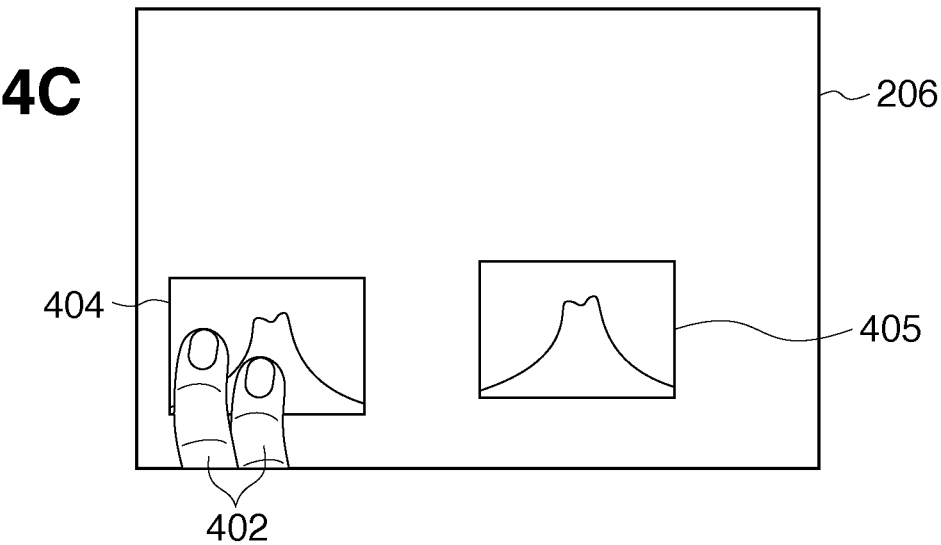

METHOD FOR CONTROLLING A USER INTERFACE, INFORMATION PROCESSING APPARATUS, AND COMPUTER READABLE MEDIUM

BACKGROUND OF THE INVENTION

1. Field of the Invention

The present invention relates to a method for controlling a user interface and an information processing apparatus. In particular, the present invention relates to an operation processing method for operating an object displayed on a screen, using a touch panel that can identify concurrent pointing at a plurality of given positions.

2. Description of the Related Art

A conventionally known touch screen includes a touch panel that can accept touch input and a screen that displays various objects. In order to copy or move an object on the touch screen, a processing method is commonly used in which a finger selecting an object is moved, and a command, such as copy or move, is selected at a position after the move operation (see Japanese Patent Laid-Open No. 2002-304256).

Furthermore, as a method performed only by operating an object on the touch screen, a method is proposed in which an operation of moving a finger selecting an object in the vertical direction is processed as a deletion or cut operation, and an operation of moving in the horizontal direction is processed as a copy operation (see Japanese Patent Laid-Open No. 2001-290585).

However, in a method for selecting a move or copy operation with a command as stated in Japanese Patent Laid-Open No. 2002-304256, a touch operation for selecting a command has to be performed in addition to a touch operation on an object that is to be operated. Accordingly, there is a problem in that the intuitive operability of the touch screen is impaired.

Furthermore, in a method for processing a move operation as a copy operation depending on the move direction as stated in Japanese Patent Laid-Open No. 2001-290585, since an object is not always disposed in a constant direction, it may be difficult for an operator to identify the direction, such as up, down, left, and right. Also, in the case where a plurality of operators operate an object from the front, rear, left, and right, it is difficult for each operator to point the object in an appropriate direction. Moreover, since the direction of a position where the object is disposed after the copy operation is not always the same as the direction pointed for the copy operation, an operation of changing the angle while dragging the object is necessary during the copy operation.

SUMMARY OF THE INVENTION

An exemplary embodiment of the present invention provides a user interface that can perform various operations on an object on a screen, with an intuitive operation on the screen.

According to one aspect of the present invention, there is provided a method for controlling a user interface that can concurrently detect a plurality of pointed positions on a screen, comprising:

detecting that a plurality of pointed positions are concurrently present in a display range of one object on the screen, using the user interface;

determining whether or not an operation of, while keeping at least one pointed position among the plurality of pointed positions, moving the other pointed positions is performed after the presence of the plurality of pointed positions is detected;

deciding processing that is to be executed in a case where at least one of the number of kept pointed positions and the number of moved pointed positions is plural, if it is determined that the operation is performed; and executing the decided processing.

Also, according to another aspect of the present invention, there is provided an information processing apparatus having a user interface that can concurrently detect a plurality of pointed positions on a screen, comprising:

a detecting unit configured to detect that a plurality of pointed positions are concurrently present in a display range of one object on the screen, using the user interface;

a determination unit configured to determine whether or not an operation of, while keeping at least one pointed position among the plurality of pointed positions, moving the other pointed positions is performed after the presence of the plurality of pointed positions is detected by the detecting unit;

a decision unit configured to decide processing that is to be executed in a case where at least one of the number of kept pointed positions and the number of moved pointed positions is plural, if it is determined that the operation is performed by the determination unit; and an execution unit configured to execute the processing decided by the decision unit on the object.

Further features of the present invention will become apparent from the following description of exemplary embodiments with reference to the attached drawings.

BRIEF DESCRIPTION OF THE DRAWINGS

FIGS. 4A to 4C are views illustrating an example of the operation according to the first embodiment.

DESCRIPTION OF THE EMBODIMENTS

Hereinafter, preferred exemplary embodiments of the present invention will be described with reference to the accompanying drawings.

First, the configuration of a computer apparatus constituting the apparatus of this embodiment will be described with reference to the configuration diagram in FIG. 1. The apparatus may be realized as a single information processing apparatus, or may be realized by distributing each function to each of a plurality of information processing apparatuses as necessary. In the case where a plurality of apparatuses is included, these apparatuses may be communicably connected via a local area network (LAN) or the like.

In this embodiment, an example will be described in which an object that is to be copied is copied by pressing the object with two fingers and dragging and dropping the object with another finger. Here, "drag" refers to an action of moving an object without releasing a finger from a touch screen, while keeping the object pressed with the finger. Furthermore, "drop" refers to an action of releasing a finger from a touch screen in a dragging state. Here, a touch screen includes a touch panel that detects the position touched by a user and a screen (display screen) that displays an object and the like.

Figure 1:
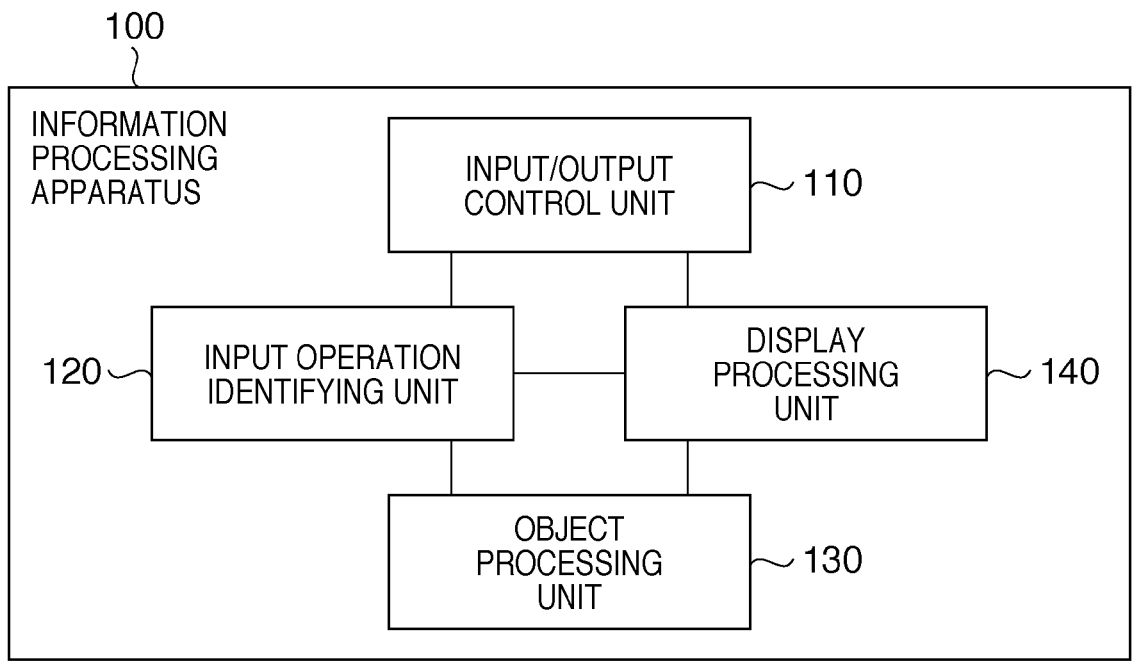
FIG. 1 is a block diagram showing an example of the logical configuration of an information processing apparatus in a first embodiment.

FIG. 1 is a block diagram showing an example of the logical configuration of an information processing apparatus 100 according to the first embodiment.

In the information processing apparatus 100 in FIG. 1, an input/output control unit 110 controls the acceptance of input from a user to the touch screen, and controls display of an object on the touch screen. An input operation identifying unit 120 identifies the operation content for the object displayed on a display processing unit 140, based on the input information from the input/output control unit 110. An object processing unit 130 executes processing of, for example, enlarging, reducing, moving, or copying the object, based on the operation content for the object identified by the input operation identifying unit 120.

The display processing unit 140 gives a display instruction to the input/output control unit 110, the display instruction being to display the operation content for the object processed by the object processing unit 130 on the touch screen. Furthermore, the display processing unit 140 has the positional information of a currently displayed object, and provides the positional information of the object to the input operation identifying unit 120 as necessary.

Figure 2:
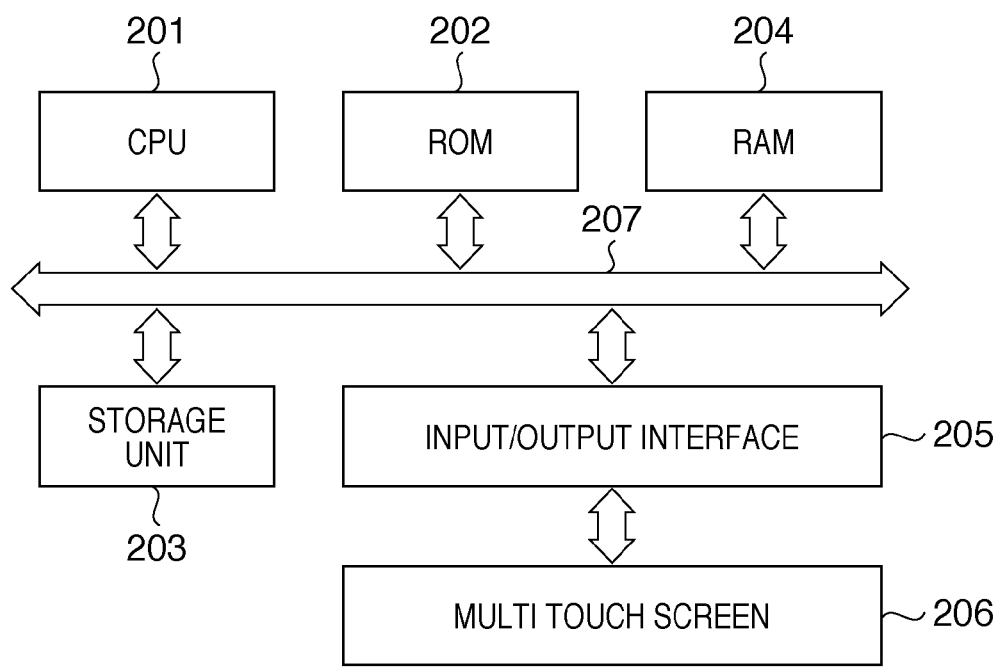
FIG. 2 is a block diagram showing an example of the hardware configuration of the information processing apparatus in the first embodiment.

FIG. 2 is a block diagram showing an example of the schematic configuration of the information processing apparatus 100 according to this embodiment.

In FIG. 2, a central processing unit (CPU) is denoted by 201, and controls each device based on a control program stored in a ROM 202 or a storage unit 203. A read only memory (ROM) is denoted by 202, and holds various control programs and various types of data executed by the CPU 201. A random access memory (RAM) is denoted by 204, and has, for example, a work area, a data back-up area at the time of error processing, and a load area of a control program, of the CPU 201. A storage unit is denoted by 203, and stores various control programs and various types of data.

An input/output interface is denoted by 205, and is an interface with a device that accepts an operation from a user and inputs data (a multi touch screen 206, in this embodiment). The input/output interface 205 is also an interface for outputting (displaying) data held by the information processing apparatus 100 or supplied data on the multi touch screen 206. The input/output interface 205 is connected to the multi touch screen 206. The multi touch screen 206 provides a user interface that can identify concurrent pointing at a plurality of given positions on a screen. A system bus that communicably connects the units 201 to 205 is denoted by 207. In this embodiment, information-processing program code containing the content of the present invention is stored in the storage unit 203, and executed by the CPU 201. A user can perform an operation using the multi touch screen 206 and see the results of the operation on the multi touch screen 206. Here, the units having the logical configuration shown in FIG. 1 are realized as a result of cooperation between software and hardware by the CPU 201 executing a program stored in the storage unit 203 and loaded into the RAM 204.

Figure 3:
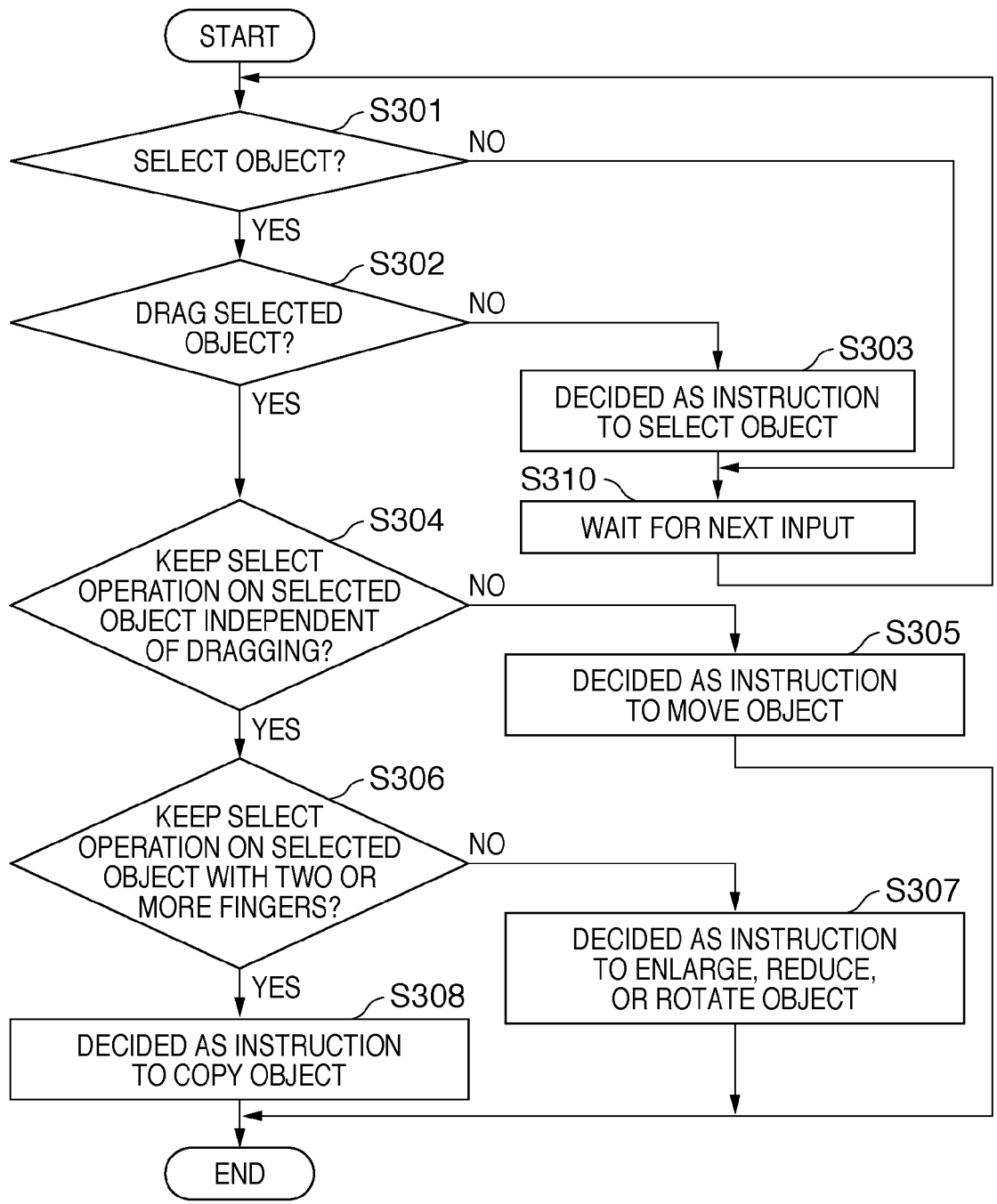
FIG. 3 is a flowchart showing an example of input operation identification processing of the information processing apparatus in the first embodiment.

FIG. 3 is a flowchart for identifying the operation content of input at the input operation identifying unit 120 of the information processing apparatus 100.

Input is performed by touching the multi touch screen 206 with a finger in a state where an object is displayed on the multi touch screen 206. The input is transferred as input information via the input/output interface 205 to the input/output control unit 110 (FIG. 1). The input information refers to information in which the position touched with a finger is held as a face (an area range in which the multi touch screen is touched with a fingertip portion). Here, a reference for determining that input is performed with a finger is that the touch point is a circle having a diameter of smaller than 2 cm, but the value is not limited to this and may be changed by the user.

The input operation identifying unit 120 determines the type of instruction according to the flowchart in FIG. 3 based on the input information from the input/output control unit 110, and obtains information on the operation content when the operation is completed.

Hereinafter, a method by which the input operation identifying unit 120 obtains the information on the operation content will be described in detail with reference to FIG. 3.

The flowchart in FIG. 3 starts if the input operation identifying unit 120 accepts input information from the input/output control unit 110 and object display information from the display processing unit 140. The object display information refers to information in which the position of an object displayed via the input/output control unit 110 on the multi touch screen 206 is held as a face. Here, "as a face" indicates that the object display information has a particular area range, that is, area. Here, the area refers to a particular area range formed by connecting the coordinates of a plurality of points on the screen. In this embodiment, if an area portion touched with a finger, that is, a pointed area range (face) intersects an area portion of a displayed object, that is, a display area range (face) of the object, it is decided that the finger selects the object.

In step S301, the input operation identifying unit 120 determines whether or not the input information and the object display information are positioned so as to intersect each other. If it is determined that these pieces of information are positioned so as to intersect each other, it is regarded that the object is selected, and the processing proceeds to step S302. Here, "positioned so as to intersect each other" indicates that the input information held as a face and the object display information held as a face are positioned such that their faces partially overlap. In other words, the input operation identifying unit 120 detects one or a plurality of pointed positions that are concurrently present in the display range of one object among one or a plurality of objects displayed on the screen. Here, it may be detected that a plurality of pointed positions are present in the display range of one particular object among one or a plurality of objects displayed on the screen.

On the other hand, if these pieces of information are not positioned so as to intersect each other, the object is regarded as not being selected, and processing proceeds to a standby for next input state (step S310). The standby for next input state (step S310) refers to a waiting state for an event in which the next input generated when the multi touch screen 206 is touched with a finger is notified as input information via the input/output control unit 110 to the input operation identifying unit 120.

In step S302, the input operation identifying unit 120 determines whether or not a drag operation is performed on the object selected in step S301. A "drag operation" has been already described. If it is determined that a drag operation is performed, the processing proceeds to step S304. Furthermore, if it is determined that no drag operation was performed, the processing proceeds to step S303. In step S303, the object is determined to be selected in step S301, but no drag operation is performed, and the input operation identifying unit 120 identifies this operation state as a state where the instruction to select the object is being performed. In this embodiment, as shown in the flowchart in FIG. 3, the processing proceeds to a waiting for input state (step S310) if only an instruction to select the object is given.

During the standby for next input state in step S310, if input is performed by touching the multi touch screen 206 with a finger, the input is transferred as input information via the input/output interface 205 to the input/output control unit 110. When the input/output control unit 110 notifies the input operation identifying unit 120 of the transferred input information, the processing from step S301 in FIG. 3 is resumed.

Here, in addition to the select and drag operations, tap, double-tap, and many other types of pointing as pointing to an object may be performed. These types of pointing are not particularly described in this embodiment, but it will be appreciated that these types of pointing and the pointing of this embodiment can coexist.

On the other hand, if it is determined that a drag operation is performed on the selected object, in step S304, the input operation identifying unit 120 determines whether or not the select operation on the selected object is kept independently of the finger performing the drag operation. That is to say, after it is detected that a plurality of pointed positions are present for one particular object, whether or not an operation of moving the other pointed positions is performed, while keeping at least one pointed position among the plurality of pointed positions, is determined. If the select operation is kept independently of the drag operation, the processing proceeds to step S306. If the object is only dragged and is not selected independently of the drag operation, the processing proceeds to step S305 where the input operation identifying unit 120 identifies this operation as an instruction to move the object.

In step S306, the input operation identifying unit 120 determines whether or not the select operation that is kept independently of the finger performing the drag operation is performed with two or more fingers. If the select operation is kept with two or more fingers, the processing proceeds to step S308, and, if not, the processing proceeds to step S307. In step S307, the input operation identifying unit 120 identifies this operation as an instruction, for example, to enlarge, reduce, or rotate the object.

On the other hand, if the processing proceeds to step S308, the input operation identifying unit 120 identifies this operation as an instruction to copy the object. With the above-described processing, the input operation identifying unit 120 identifies the type of instruction given on the multi touch screen 206. As described above, in step S306, the input operation identifying unit 120 decides the processing that is to be executed, based on the number of kept pointed positions and the number of moved pointed positions. Then, in step S307 or S308, each decided process is executed.

Next, a method by which the input operation identifying unit 120 identifies the operation content when an instruction operation is completed will be described. The identified operation content is transferred to the object processing unit 130.

In a state where an instruction to select the object is being performed in step S303 in FIG. 3, the instruction to select the object is completed when it is detected that the finger selecting the object is released from the multi touch screen 206.

Completion of the instruction to move the object in step S305 in FIG. 3 is decided when it is detected that the moving finger is released from the multi touch screen 206. The input operation identifying unit 120 identifies the operation content of moving the object to the position where the finger is released.

Completion of an instruction to enlarge, reduce, or rotate the object in step S307 in FIG. 3 is decided when it is detected that the moving finger is stopped or released from the multi touch screen 206. The input operation identifying unit 120 identifies the operation content of enlarging, reducing, or rotating the object, according to the completion of an instruction to enlarge, reduce, or rotate the object.

Regarding the instruction to copy the object in step S308 in FIG. 3, when it is detected that the moving finger is released from the multi touch screen 206, the operation content of copying the object to the position where the finger is released is identified. At that time, an instruction to copy the object may be identified when it is detected that the pointed position of the moving finger moves away from the selected object and then the finger is released.

As described above, the object processing unit 130 executes the processing of, for example, enlarging, reducing, moving, or copying the target object, according to the operation content identified by the input operation identifying unit 120, and gives a display instruction to the display processing unit 140. The display processing unit 140 displays the object reflecting the operation content on the touch screen, by giving a display instruction to display on the touch screen to the input/output control unit 110.

Here, even in the case where the select operation on the original object is canceled before the finger moving during the instruction to copy the object is released from the multi touch screen 206, the copy operation is kept in this embodiment. However, in the case where the select operation on the original object is canceled before the finger moving during the instruction to copy the object is released from the multi touch screen 206, the copy operation may be interrupted.

Hereinafter, the operation of copying an object will be specifically described with reference to FIGS. 4A to 4C.

In FIGS. 4A to 4C, an object 404 is displayed on the multi touch screen 206. Two fingers selecting the object 404 are denoted by 402. One finger that is different from the two fingers 402 selecting the object 404 is denoted by 403. The object displayed on the multi touch screen 206 is denoted by 404, and is a thumbnail image showing a photograph of a mountain as an example.

In FIG. 4A, the object 404 is selected with the two fingers 402 and the finger 403.

FIG. 4B shows a state in which a drag (move) operation is performed with the finger 403 from the state shown in FIG. 4A. In FIG. 4B, a copy of the object 404 (a copy of the thumbnail image showing the photograph of the mountain) is denoted by 405. In FIG. 4B, the copy 405 of the object 404 is being dragged, and, thus, the copy is translucently displayed.

FIG. 4C shows a state in which the finger 403 is released from the multi touch screen 206 after the state shown in FIG. 4B. In FIG. 4C, the copy processing has been completed, and, thus, the copy 405 of the thumbnail image showing the photograph of the mountain is not translucently, but normally displayed.

Next, the copy operation shown in FIGS. 4A to 4C will be described.

First, as shown in FIG. 4A, the user selects the object 404 (the thumbnail image showing the photograph of the mountain) that the user wants to copy, with the two fingers 402 and the finger 403. Then, as shown in FIG. 4B, while keeping the object 404 selected with the two fingers 402, the user performs a drag operation with the finger 403. Then, as shown in FIG. 4C, the finger 403 performing the drag operation in FIG. 4B is released from the multi touch screen 206. With this operation, the object 404 is recognized as being dropped, and the copy 405 of the object 404 (the thumbnail image showing the photograph of the mountain) is disposed at the position where the finger 403 was released. In this manner, the thumbnail image showing the photograph of the mountain (the object 404) can be copied, and the copy can be disposed at a given position.

Here, the copy of the thumbnail image on the screen is a copy of a symbol such as an icon, but it will be appreciated that the file of the photograph of the mountain from which the thumbnail image is formed is also copied. Here, the file is written to an area secured in the storage unit 203 or the RAM 204 and held. When the file is held under a drive or folder under the drive, the file is stored in the area under the drive or under the folder of the drive. The drive or folder may be a logical management system, or may be physically present.

Here, in this embodiment, an image from which a copy is formed is selected with two fingers, but it will be appreciated that the number of fingers is not limited as long as the number is 2 or more. That is to say, while keeping the original image selected with two fingers, a drag operation can be performed with another finger, and, while keeping the original image selected with three or more fingers, a drag operation can be performed with another finger. Furthermore, while keeping the original image selected with two or more fingers, a drag operation can be performed with two or more fingers.

Furthermore, in this embodiment, a photograph is shown as an example of the object, but it will be appreciated that the object may be, for example, music data or document data, or a folder or shortcut that organizes or substitutes data.

As described above, according to this embodiment, a copy operation can be performed only with a touch operation to the touch screen, which is intuitive and can be clearly distinguished from an operation of moving, enlarging, reducing, or rotating the object. That is to say, according to this embodiment, an operation of moving, enlarging, reducing, or rotating the object and an operation of copying the object are identified from each other not by the direction of the object but by the number of fingers pressing the object and the fingers moving from the object. Accordingly, an operation of moving the object or an operation of reducing or enlarging the object performed by reducing or increasing the gap between two fingers can be prevented from being falsely recognized as a copy operation, and, thus, such a copy operation can be easily and reliably performed.

Here, in the first embodiment, first, one object is pointed with three fingers, and when, while keeping the pointed position with two fingers among the fingers, a drag operation is performed with the other finger, the operation is determined to be a copy operation, and the corresponding processing is executed. However, the present invention is not limited to this sort of embodiment. This point will be described by way of a second embodiment and a third embodiment.

Next, a second embodiment will be described. The basic configuration of the second embodiment is as in the first embodiment (FIGS. 1 to 3).

FIGS. 5A to 5D are views illustrating an example of an operation of copying an object according to the second embodiment. In the first embodiment, an example was shown in which the number of fingers performing a drag operation from an object is one. In the second embodiment, an example will be shown in which the number of fingers performing a drag operation from an object is two.

In FIGS. 5A to 5D, two fingers selecting an object 504 are denoted by 502. One finger that is different from the fingers 502 selecting the object 504 is denoted by 503. The object displayed on the multi touch screen 206 is denoted by 504, and is a thumbnail image showing a photograph of a mountain as an example. One finger that is also different from the two fingers 502 selecting the object 504 in FIGS. 5A to 5D and the finger 503 is denoted by 505.

Figure 5A:
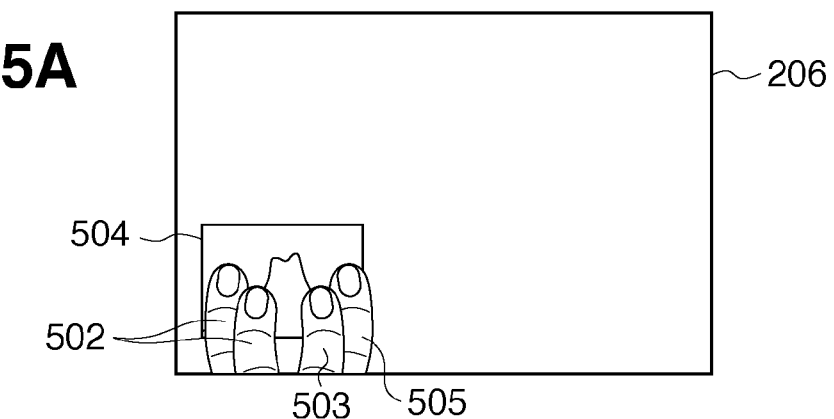
FIGS. 5A to 5D are views illustrating an example of the operation according to the second embodiment.
Figure 5B:
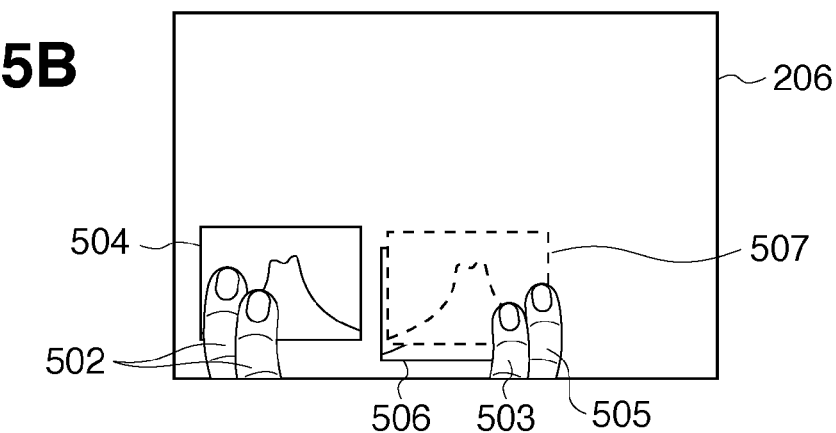

In FIG. 5A, the object 504, which is the thumbnail image showing the photograph of the mountain, is selected with the two fingers 502, the finger 503, and the finger 505. FIG. 5B shows a state in which a drag (move) operation is performed with the finger 503 and the finger 505 from the state shown in FIG. 5A. In FIG. 5B, copies of the object 504, which is the thumbnail image showing the photograph of the mountain, are denoted by 506 and 507. In the state shown in FIG. 5B, the copy 506 and the copy 507 are being dragged, and, thus, the copies are translucently displayed.

Figure 5C:
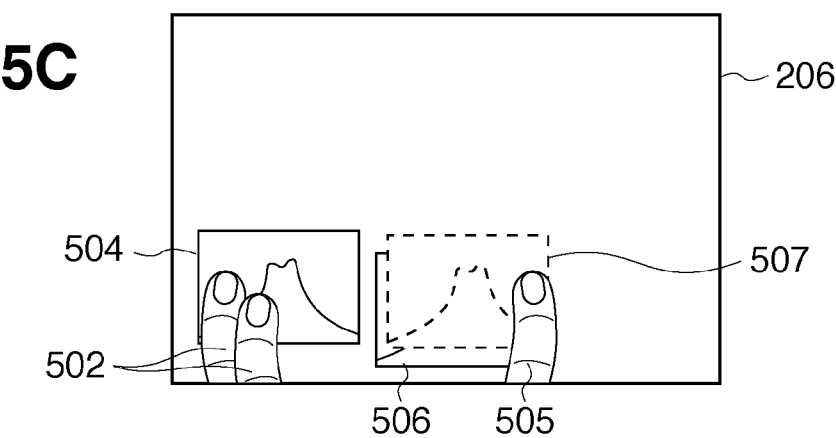
Figure 5D:
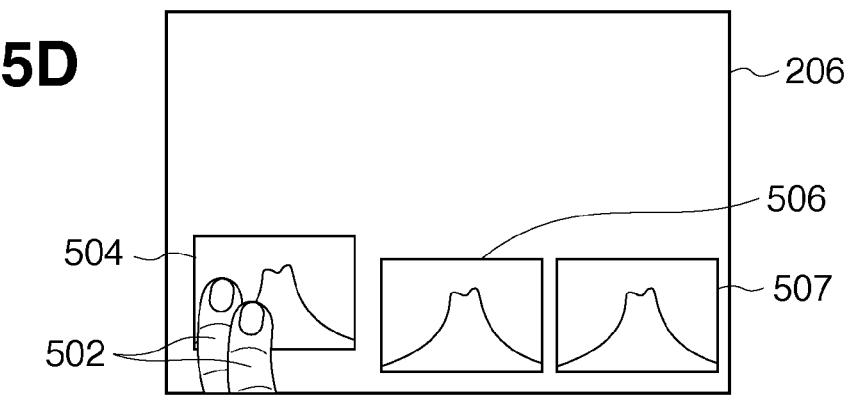

FIG. 5C shows a state in which the finger 503 is released from the multi touch screen 206 after the state shown in FIG. 5B. In FIG. 5C, the copy processing has been completed, and, thus, the copy 506 of the thumbnail image showing the photograph of the mountain is not translucently, but normally displayed. Since the other copy 507 of the thumbnail image showing the photograph is still being dragged, the copy is translucently displayed. In FIG. 5D, the finger 505 has been released from the multi touch screen 206 to complete copy processing, and, thus, the copy 507 is not translucently, but normally displayed.

Next, the copy operation in FIGS. 5A to 5D will be described.

In FIG. 5A, the user selects the object 504 (the thumbnail image showing the photograph of the mountain) that is to be selected, with the two fingers 502, the finger 503, and the finger 505. Then, as shown in FIG. 5B, while keeping the object 504 selected with the two fingers 502, the user performs a drag operation with the finger 503 and the finger 505. Then, as shown in FIG. 5C, the finger 503 performing the drag operation in FIG. 5B is released from the multi touch screen 206, and the copy 506 is recognized as being dropped. Accordingly, the copy 506 of the thumbnail image showing the photograph of the mountain is disposed at the position where the finger 503 was released. Then, as shown in FIG. 5D, the finger 505 performing the drag operation in FIG. 5C is released from the multi touch screen 206, and the copy 507 is recognized as being dropped. As a result, as shown in FIG. 5D, the other copy 507 of the thumbnail image showing the photograph of the mountain is disposed at the position where the finger 505 was released.

Here, in the processing according to the second embodiment, when a copy instruction is given in step S308 of the flowchart in FIG. 3 shown in the first embodiment, the drag and copy instruction need only be performed for the number of fingers performing a drag operation.

Here, in this embodiment, a description was given in which the number of fingers performing a drag operation is two, but there is no limitation to this. It will be appreciated that, even in the case where a drag operation is performed with two or more fingers, a copy operation can be performed for the number of fingers.

As described above, in the second embodiment, an object is repeatedly copied for the number of moved pointed positions among a plurality of pointed positions that are not fewer than the predetermined number on one object, and as many copies as there are moved pointed positions are formed.

Furthermore, in this embodiment, an example was shown in which a drag operation is performed concurrently with two fingers, but there is no limitation to this. A configuration is also possible in which a plurality of copy operations can be performed in a similar manner by, during a drag operation with one finger, further starting a drag operation with another finger. That is to say, the number of repetitions of a copy operation being performed on the object is added, according to the addition of a pointed position into a display area of a copy of the object displayed following a moved pointed position.

As described above, according to the second embodiment, a plurality of copy operations can be concurrently executed with an intuitive operation.

Next, a third embodiment will be described. The basic configuration of the third embodiment is as in the first embodiment and the second embodiment.

In the first embodiment, the number of fingers keeping an object that is to be copied selected was two or more, and the number of fingers performing a drag operation from the object that is to be copied was one. Furthermore, in the second embodiment, the number of fingers keeping an object that is to be copied selected was two or more, and the number of fingers performing a drag operation from the object that is to be copied was two or more. In the third embodiment, the number of fingers keeping an object that is to be copied selected is one, but the number of fingers performing a drag operation from the object that is to be copied is two or more. Hereinafter, the third embodiment will be described.

In the case where an operation of enlarging, reducing, or rotating the target object is performed with two fingers, if the number of fingers selecting the object that is to be copied is three or more, this operation can be identified from the operation of enlarging, reducing, or rotating the target object. Accordingly, after the target object is selected with three fingers, a copy operation can be performed by keeping the select operation with one finger and performing a move operation with two fingers. Furthermore, in this case, two copies may be formed, or only one copy may be formed. That is to say, in the second embodiment, an example was shown in which as many copies as there are moved fingers are formed, but, in the third embodiment, only one copy may be formed regardless of the number of moved fingers.

Here, in the flowchart in FIG. 3 described in the first embodiment, whether or not the select operation on the selected object is kept with two or more fingers was determined in step S306. On the other hand, in the third embodiment, "whether or not the selected object is dragged with two or more fingers" is determined in step S302, and "whether or not the select operation is kept with one or more fingers" is determined in step S306.

As described above, according to the input operation identification processing described in the first embodiment to the third embodiment, if at least one of the number of kept pointed positions and the number of moved pointed positions, among a plurality of pointed positions pointing an object, is plural, it is decided that copy processing is to be performed.

For example, in the case where an operation of moving, enlarging, reducing, or rotating an object is performed with less than the predetermined number of (i.e., one or two) fingers, whether or not an operation that is different from the operation has been instructed can be determined based on whether or not the number of pointed positions is the predetermined number or more. Here, examples of such a different operation include a copy operation as described in the first embodiment to the third embodiment. Note that there is no limitation to this, and, for example, deletion processing can be taken as the different operation as described later in a fifth embodiment.

The basic configuration of the fourth embodiment is as in the first embodiment and the second embodiment.

In the first embodiment and the second embodiment, it was assumed that the multi touch screen 206 is operated by one person, but there is no limitation to this. For example, the present invention can be applied also to a case where a multi touch screen on a table is concurrently operated by a plurality of users. That is to say, a select or drag operation on an object does not have to be performed by one person, and a copy operation can be performed without any problem even with fingers belonging to mutually different operators.

Next, a fifth embodiment will be described. The basic configuration of the fifth embodiment is as in the first embodiment. In the first embodiment, an example was shown in which a copy operation is performed, but there is no limitation to this. For example, a configuration is also possible in which the number of fingers keeping an object selected is three, a drag operation is performed with one or more fingers, and deletion processing of the selected object is performed. In this case, it may be decided that a deletion instruction is given if a finger performing a drag operation is released after the pointed position of the finger moves away from the display range of the object (if the pointed position disappears). Since it is confirmed that the pointed position disappears at a position outside the display range of the object, erroneous operations can be prevented.

Next, a sixth embodiment will be described. The basic configuration of the sixth embodiment is as in the first embodiment. In the first embodiment, the multi touch screen 206 was used as a user interface that can identify concurrent pointing at a plurality of given positions on a screen, but the present invention is not limited to this. Instead of a multi touch screen, the sixth embodiment includes a screen that performs display and a pointing device that can perform concurrent pointing at a plurality of given positions on the screen and can obtain information on the pointed positions. That is to say, in the sixth embodiment, the detection and acquisition of pointed positions pointed with the pointing device are performed, instead of the detection and acquisition of pointed positions pointed on a touch panel in the multi touch screen 206.

In this case, the multi touch screen 206 in FIG. 2 is divided into a screen that performs output (display) and a pointing device that performs input. Accordingly, the input/output interface 205 and the input/output control unit 110 accept input information from the pointing device and output information to the screen. Furthermore, the input/output interface 205 may be divided into an input interface and an output interface. In a similar manner, the input/output control unit 110 may be divided into an input control unit and an output control unit.

Here, it will be appreciated that pointing for input using the pointing device can be performed by means of a wired or wireless connection, visible rays, invisible rays, or the like, but there is no limitation to these.

Furthermore, a configuration is also possible in which no pointing device is used and non-contact pointing on a screen can be performed with a fingertip.

In the above-described configuration, it is clear that an object displayed on the screen can be operated as in the first embodiment to the fifth embodiment, with pointing using a pointing device or the like.

Note that the case where the functionality of the above-mentioned embodiment is achieved by directly or remotely supplying a software program to a system or device and reading out and executing the supplied program code through a computer in the system or device is included in the scope of the present invention. In this case, the supplied program is a computer program that corresponds to the flowchart indicated in the drawings in the embodiment.

Accordingly, the program code itself, installed in a computer so as to realize the functional processing of the present invention through a computer, also realizes the present invention. In other words, the computer program itself, for realizing the functional processing of the present invention, is also included within the scope of the present invention.

In this case, object code, a program executed through an interpreter, script data supplied to an OS, or the like may be used, as long as it has the functions of the program.

Examples of the a computer readable storage medium that can be used to supply the computer program include Floppy® disks, hard disks, optical disks, magneto-optical disks, MOs, CD-ROMs, CD-Rs, CD-RWs, magnetic tape, non-volatile memory cards, ROMs, and DVDs (DVD-ROMs, DVD-Rs).

Using a browser of a client computer to connect to an Internet homepage and downloading the computer program of the present invention to a storage medium such as a hard disk can be given as another method for supplying the program. In this case, the downloaded program may be a compressed file including a function for automatic installation. Furthermore, this method may be realized by dividing the program code that makes up the program of the present invention into a plurality of files and downloading each file from different homepages. In other words, a WWW server that allows a plurality of users to download the program files for realizing the functional processing of the present invention through a computer also falls within the scope of the present invention.

Furthermore, the program of the present invention may be encrypted, stored in a storage medium such as a CD-ROM, and distributed to users. In this case, a user that has cleared a predetermined condition is allowed to download key information for removing the cryptography from a homepage via the Internet, use the key information to decrypt the program, and install the program on a computer.

Also, the functions of the present embodiment may be realized, in addition to through the execution of a loaded program using a computer, through cooperation with an OS or the like running on the computer based on instructions of the program. In this case, the OS or the like performs part or all of the actual processing, and the functions of the above-described embodiment are realized by that processing.

Furthermore, part or all of the functionality of the aforementioned embodiment may be written into a memory provided in a function expansion board installed in the computer, a function expansion unit connected to the computer, or the like, into which the program read out from the storage medium is written. In this case, after the program has been written into the function expansion board or the function expansion unit, a CPU or the like included in the function expansion board or the function expansion unit performs part or all of the actual processing based on the instructions of the program.

As described above, according to the present invention, various operations can be performed on an object on a screen with an intuitive operation on the screen.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-147073, filed Jun. 4, 2008, which is hereby incorporated by reference herein in its entirety.

What is claimed is:

1. A method for controlling a user interface that can concurrently detect a plurality of pointed positions on a screen, the method comprising:

detecting that a plurality of pointed positions are concurrently present in a display range of an object on the screen, using the user interface;

determining, after the presence of the plurality of pointed positions is detected, whether or not an operation of, while at least one pointed position among the plurality of pointed positions is kept, moving the other pointed positions of the plurality of pointed positions is performed;

determining, when it is determined that the operation is performed, whether the number of kept pointed positions is single or plural;

executing, in a case it is determined that there are plural kept pointed positions, copy processing in which data corresponding to the object is copied and a copy of the object is located at the moved pointed positions; and executing, in a case it is determined that there is a single kept pointed position, enlargement/reduction processing in which a size of the object is enlarged or reduced in accordance with a distance between the kept pointed position and the moved pointed positions, wherein the copy processing of the object is repeated each time the number of moved pointed positions is reduced.

2. The method according to claim 1, further comprising specifying the number of kept pointed positions, wherein the copy processing is executed when the number of kept pointed positions is two, and deletion processing of data corresponding to the object is executed when the number of kept pointed positions is three.

3. The method according to claim 1, wherein in said detecting step, a pointed position is detected from a user pointing on a touch panel or using a pointing device.

4. The method according to claim 1, further comprising displaying a copy of the object on the screen following the operation of moving the pointed positions, wherein a copy of the object following the operation of moving the pointed positions is generated at a time when the number of moved pointed positions is reduced.

5. An information processing apparatus comprising a processor, the information processing apparatus having a user interface that can concurrently detect a plurality of pointed positions on a screen, the information processing apparatus comprising:

a detecting unit configured to detect that a plurality of pointed positions are concurrently present in a display range of an object on the screen;

a first determination unit configured to determine, after the presence of the plurality of pointed positions is detected by said detecting unit, whether or not an operation of, while at least one pointed position among the plurality of pointed positions is kept, moving the other pointed positions of the plurality of pointed positions is performed;

a second determination unit configured to determine, when it is determined by said first determination unit that the operation is performed, whether the number of kept pointed positions is single or plural;

a first execution unit configured to execute, in a case it is determined that there are plural kept pointed positions, copy processing in which data corresponding to the object is copied and a copy of the object is located at the moved pointed positions; and a second execution unit configured to execute, in a case it is determined that there is a single kept pointed position, enlargement/reduction processing in which a size of the object is enlarged or reduced in accordance with a distance between the kept pointed position and the moved pointed positions, wherein the copy processing of the object is repeated each time the number of moved pointed positions is reduced.

6. The apparatus according to claim 5, further comprising a specifying unit configured to specify the number of kept pointed positions,
wherein said first execution unit executes the copy processing when the number of kept pointed positions is two, and executes deletion processing of data corresponding to the object when the number of kept pointed positions is three.

7. The apparatus according to claim 5, wherein said detecting unit detects a pointed position from a user pointing on a touch panel or using a pointing device.

8. The apparatus according to claim 5, further comprising a displaying unit configured to display a copy of the object on the screen following the operation of moving the pointed positions,
wherein a copy of the object following the operation of moving the pointed positions is generated at a time when the number of moved pointed positions is reduced.

9. A non-transitory computer-readable storage medium storing a program for causing a computer to execute a method for controlling a user interface that can concurrently detect a plurality of pointed positions on a screen, the method comprising:

detecting that a plurality of pointed positions are concurrently present in a display range of an object on the screen, using the user interface;

determining whether or not, after the presence of the plurality of pointed positions is detected, an operation of, while at least one pointed position among the plurality of pointed positions is kept, moving the other pointed positions of the plurality of pointed positions is performed;

determining, when it is determined that the operation is performed, whether the number of kept pointed positions is single or plural;

executing, in a case it is determined that there are plural kept pointed positions, copy processing in which data corresponding to the object is copied and a copy of the object is located at the moved pointed positions; and executing, in a case it is determined that there is a single kept pointed position, enlargement/reduction processing in which a size of the object is enlarged or reduced in accordance with a distance between the kept pointed position and the moved pointed positions, wherein the copy processing of the object is repeated each time the number of moved pointed positions is reduced.

* * * * *